United States Patent [19]

Akridge

[11] Patent Number: 4,599,284
[45] Date of Patent: Jul. 8, 1986

[54] VITREOUS PHOSPHORUS OXIDE-SULFIDE SOLID LITHIUM ELECTROLYTE

[75] Inventor: James R. Akridge, Parma, Ohio

[73] Assignee: Union Carbide Corporation, Danbury, Conn.

[21] Appl. No.: 782,467

[22] Filed: Oct. 1, 1985

[51] Int. Cl.$^4$ ............................................. H01M 6/18
[52] U.S. Cl. ..................................... 429/191; 429/193
[58] Field of Search ................................ 429/191, 193

[56] References Cited

U.S. PATENT DOCUMENTS

| | | | |
|---|---|---|---|
| 4,042,482 | 8/1977 | Shannon et al. | 429/193 |
| 4,331,750 | 5/1982 | Malugani et al. | 429/193 |
| 4,444,857 | 4/1984 | Duchange et al. | 429/191 |
| 4,465,746 | 8/1984 | Akridge | 429/191 |
| 4,477,545 | 10/1984 | Akridge | 429/191 |
| 4,478,920 | 10/1984 | Gabano et al. | 429/193 |
| 4,513,070 | 4/1985 | Carette et al. | 429/193 |

*Primary Examiner*—Donald L. Walton
*Attorney, Agent, or Firm*—C. F. O'Brien

[57] ABSTRACT

A vitreous solid state electrolyte for solid state cell systems employing a phosphorus oxide-sulfide network former.

18 Claims, No Drawings

VITREOUS PHOSPHORUS OXIDE-SULFIDE SOLID LITHIUM ELECTROLYTE

DESCRIPTION OF THE INVENTION

1. Technical Field

The invention relates to a phosphorus oxide-sulfide solid state electrolyte based on a vitreous lithium cation conductor of the composition:

$$P_4O_aS_b, cLi_2S, dLi_2O, eX$$

where:
X is selected from the group consisting of LiBr, LiCl, LiF, LiI, $Li_2CO_3$, $Li_2SO_4$, $Li_2SiO_3$ and $Li_4SiO_4$;
a is equal to (10−b) with b being greater than 0 and less than 10 with the proviso however that when b is 6 a can be 3;
c and d are from 0 to about 4 with the proviso that when c and d are both greater than 0 then d=4-c, and when c or d is 0 then d or c, respectively is greater than 0;
e is from 0 to about 7; and wherein said composition preferably has a conductivity of at least $0.75 \times 10^{-4}$ ohm$^{-1}$cm$^{-1}$ at 25° C.

2. Background of the Art

Ionic conductivity is usually associated with the flow of ions through a liquid solution of salts. In the vast majority of practical uses of ionic conductors, i.e., as electrolytes for dry cell batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization.

In addition, improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow ionic migration through the solid electrolyte. It has been discovered that certain metallic salts which are solids at room temperature have specific conductances sufficiently high to permit their use in practical battery applications. For example, U.S. Pat. No. 3,723,185 discloses solid state electrolytes of compounds conforming to the general formula AgI-MCN-AgCN or modifications thereof where M is potassium, rubidium, cesium or mixtures thereof.

U.S. Pat. No. 4,331,750 discloses a cation conductive vitreous composition suitable for use as a solid electrolyte and having the general formula:

$$aP_2S_5, bLi_2S, cLiX$$

where:
X represents chlorine, bromine or iodine:
c is greater than or equal to 0;
the ratio b/(a+b) lies between 0.61 and 0.70; and
the ratio c/(a+b+c) is less than or equal to a limit which corresponds to solubility in the vitreous phase of LiX in the composition $aP_2S_5$, $bLi_2S$.

U.S. Pat. No. 4,465,746 discloses a solid state electrolyte based on vitreous lithium cation conductor of the composition:

$$SiS_2, xLi_2S, yLiI$$

where:
x is from 0.8 to 1.5,
y is from 0 to about 2, and wherein said composition has a conductivity of at least $0.75 \times 10^{-4}$ ohm$^{-1}$cm$^{-1}$ at 25° C.

U.S. Pat. No. 4,513,070 discloses an electrochemical device which uses a vitreous material having a general formula $$xA_aR_b - yN_mR_c - zN_nY_p$$

wherein A is Si, Ge, P, S, B, Nb, As, V, Cr or Mo; R is O, S or Se; Ni is Li, Na, K or Ag and Y is I, Br, Cl, F, $ClO_4$, $CF_3SO_3$, SCN or $SO_4$ with the proviso that the material contain at least two salts $N_nY_p$ and wherein a, b; m, c and n, p represents the indices corresponding to the stoichiometry of the constituents in a given group and x, y and z, whose sum is equal to 1, represent the indices corresponding to the overall molar fractions respectively of the compound or compounds forming the former system, the modifier system and the doping salt of the material, the values of these indices being compatible with the vitreous range of a given material.

U.S. patent application Ser. No. 749,780 filed on June 28, 1985 discloses a quaternary solid electrolyte having a vitreous lithium cation conductor of the composition:

$$aX, bLi_2S, Y, Z$$

where
X is selected from the group consisting of $P_2S_5$ and $SiS_2$;
a is from about 0.5 to about 2;
b is from 0.25 to 2;
Y is an oxygen-containing lithium compound selected from the group consisting of $Li_2CO_3$, $Li_2SiO_3$ and $Li_4SiO_4$; and
Z is a dopant selected from the group consisting of LiI, LiBr, LiCl and LiF.

U.S. patent application Ser. No. 749,774 filed on June 29, 1985 discloses a vitreous lithium cation conductor of the composition:

$$aX, bLi_2S, Y$$

where:

X is selected from the group consisting of P$_2$S$_5$ and SiS$_2$;

a is from about 0.5 to about 2;

b is from 0.25 to 2; and

Y is an oxygen-containing lithium compound such as Li$_2$CO$_3$, Li$_2$O, LiOH, Li$_2$SiO$_3$, Li$_2$SO$_4$ and Li$_4$SiO$_4$.

It is an object of the present invention to provide a new class of phosphorus oxide-sulfide compositions that can be used as solid electrolytes in solid state cell systems.

It is another object of the present invention to provide a solid electrolyte comprising a phosphorus oxide sulfide having a conductivity of at least $0.75 \times 10^{-4}$ ohm$^{-1}$cm$^{-1}$ at 25° C.

The foregoing and additional objects will become fully apparent from the following description.

DISCLOSURE OF THE INVENTION

The invention relates to a phosphorus oxide-sulfide solid state electrolyte having a vitreous lithium cation conductor of the composition:

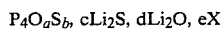

P$_4$O$_a$S$_b$, cLi$_2$S, dLi$_2$O, eX where:

X is selected from the group consisting of LiBr, LiCl, LiF, LiI, Li$_2$CO$_3$, Li$_2$SO$_4$, Li$_2$SiO$_3$ and Li$_4$SiO$_4$;

a is equal to (10−b) with b being greater than 0 and less than 10 with the proviso however that when b is 6 a can be 3;

c and d are from 0 to about 4 with the proviso that when c and d are both greater than 0 then d=4−c, and when c or d is 0 then d or c, respectively, is greater than 0; and e is from 0 to about 7.

The preferred phosphorus oxide-sulfide network formers for use in the invention are P$_4$O$_9$S, P$_4$O$_8$S$_2$, P$_4$O$_7$S$_3$, P$_4$O$_6$S$_4$, P$_4$O$_5$S$_5$, P$_4$O$_4$S$_6$, P$_4$O$_3$S$_6$, P$_4$O$_3$S$_7$, P$_4$O$_2$S$_8$ and P$_4$OS$_9$.

Preferably c or d should be from about 1 to about 4 and e should be preferably from about 0 to about 5.

The preferred lithium compounds for use in the invention other than the phosphorus oxide-sulfide network formers recited above could be network dopants such as LiBr, LiCl, LiF and LiI; network formers such as Li$_2$CO$_3$, Li$_2$SiO$_3$ and Li$_4$SiO$_4$; and/or network modifiers such as Li$_2$S and Li$_2$O. A network dopant is a compound added to a network former or the network former plus network modifier which provides additional mobile cations but whose associated anion does *not* become incorporated into the macromolecular structure but rather plays a role more like a plasticizer especially in the case of halogenated salts.

A network former is a compound which provides a macromolecular network of irregular structure whereby the anion of the network former, i.e., O$^=$, S$^=$ etc., forms bridges between the cations of the network former resulting in the formation of an extended network. A network modifier is an ionic compound added to a network former which introduces covalency into the macromolecular network by incorporating its anion into the macromolecular network by cleavage of some of the bridges between the network former cation and the associated network former anion and bonding the modifier anion to the network former cation.

As used herein, vitreous shall mean a composition in a glassy (non-crystalline) state and shall also include materials that have been cooled so rapidly from the molten condition that crystal formation is prevented.

The vitreous compositions of this invention can be prepared at 1 atmosphere pressure by first mixing the phosphorous oxide-sulfide with at least one network modifier with or without a network dopant and/or network former of appropriate stoichiometry in a dry box filled with an inert gas. The mixture is then placed in a vitreous carbon crucible which in turn is placed in an inert gas reaction chamber. The mixture is heated at an elevated temperature for a time period sufficient for the phosphorous oxide-sulfide to react with the network modifier and, if used, the network dopant and/or another network former. Generally when using Li$_2$S as the network modifier along with LiI as the network dopant, the mixture can be heated at about 950° C. for about 1 hour. The fused mixture is then generally quenched to ambient temperature (about 20° C.) to form the vitreous solid.

If desired, the network modifier and, when used, the network dopant and/or another network former can be added to a fused phosphorus oxide-sulfide compound, placing the mixture in a vitreous carbon crucible and then heating the mixture at an elevated temperature for a time period sufficient to form a solution in the fused phosphorus oxide-sulfide compound. The mixture can then be quenched to room temperature (about 20° C.). Generally the mixture using the same components as recited above can be heated at about 950° C. for about 1 hour.

To form a fused phosphorous oxide-sulfide compound, P$_2$O$_5$ could be mixed with P$_2$S$_5$ and then heated to form a fused product. For example 0.8 mole P$_2$O$_5$ could be mixed with 1.2 mole P$_2$S$_5$ and then heated at an elevated temperature of about 500° C. to form P$_4$O$_4$S$_6$. This phosphorus oxide-sulfide compound could then be mixed with a network modifier and, if desired, a network dopant and/or another network former as discussed above.

Preferred solid electrolyte compositions of this invention are 2LiBr.2Li$_2$S.P$_2$O$_3$S$_2$; 5LiI.4Li$_2$S.P$_4$OS$_9$; 2LiI.2Li$_2$S.P$_2$O$_2$S$_3$; and 2.5LiI.2Li$_2$S.P$_2$O$_2$S$_3$.

The most preferred solid electrolyte composition is 5LiI.4Li$_2$S.P$_4$OS$_9$.

Anode materials suitable for use with the solid electrolyte of this invention include lithium, silver, sodium, potassium and rubidium. The preferred anode materials are lithium and lithium alloys.

Cathodes suitable for use with the solid electrolyte of this invention include poly(N-vinylpyrrolidone) (PVP)+iodine, PVP+iodine+TiS$_2$, FeS$_2$, Sb$_2$S$_3$, TiS$_2$, MoS$_3$, TiS$_2$+MoS$_3$, organic charge transfer complexes with halogens, and MnO$_2$.

EXAMPLE 1

Vitreous P$_4$O$_4$S$_6$ was prepared by mixing 3 grams P$_2$O$_5$ and 7 grams P$_2$S$_5$ in 1 to 1.5 mole ratio in a helium-filled dry box. The mixture was placed in a vitreous carbon crucible which in turn was placed in a vitreous silica reaction tube. The tube was closed and was equipped with a conventional exhaust vent and a small conventional intake feed tube adapted for feeding helium into the reaction tube. The P$_2$O$_5$ and P$_2$S$_5$ mixture, under a 1 atmosphere pressure of helium, was heated at 950° C. for 10 minutes and then the reaction tube was quenched to room temperature (20° C.) by submerging the reaction tube in cold water. The vitreous P$_4$O$_4$S$_6$ produced was then ground.

Ten grams of the vitreous $P_4O_4S_6$ produced was combined with 17.6 grams of LiI and 4.83 grams of $Li_2S$. The mixture was ground, placed in a vitreous carbon crucible and then placed in a reaction tube. Under 1 atmosphere helium pressure, the $P_4O_4S_6$ and LiI and $Li_2S$ mixture was heated at 950° C. for 10 minutes and then the reaction tube was quenched to room temperature (20° C.) by submerging the reaction tube in cold water. The vitreous $2.5LiI.Li_4P_2O_2S_5$ solid electrolyte produced was ground, pelletized and found to have a conductivity of $3.0 \times 10^{-4} ohm^{-1} cm^{-1}$ at 25° C.

Specifically the conductivity was measured by pelletizing (via the application of uniaxial pressure) the powdered material between titanium disulfide electrodes at 13,000 psi in a conventional steel mold with steel rams. The disc of solid electrolyte with $TiS_2$ electrodes was ejected from the mold and then heat sealed in a polyethylene bag. The sample sealed in the bag was then placed in an alcohol-filled polytetrafluoroethylene cylinder with a tight fitting lid which was in turn placed in a large steel mold fitted with steel rams. The alcohol-filled polytetrafluoroethylene cylinder containing the sample was then compressed to 54,000 psi which results in an isostatic compression of the glass sample disc and its associated electrodes. The $TiS_2$/solid electrolyte/$TiS_2$ sample was placed in a spring-loaded holder fitted with gold contacts. The conductivity of the sample was measured using the complex plane technique first applied to solid electrolytes by J. E. Bauerle, J. Phys. Chem. Solids, 30,2657 (1969). The complex plane technique is at present almost universally applied for the measurement of conductivity of solid electrolytes.

EXAMPLE 2

Example 1 was repeated except that 4.9 grams of $P_2O_5$ and 5.1 grams of $P_2S_5$ in a 1.5 to 1 mole ratio was used. The same procedure was employed as in Example 1 along with 15.4 grams of LiI and 4.8 grams of $Li_2S$. The vitreous $2.5LiI.Li_4P_2O_3S_4$ solid electrolyte produced was ground, pelletized and found to have a conductivity of $0.23 \times 10^{-4} ohm^{-1} cm^{-1}$ at 25° C.

EXAMPLE 3

Three 0.787 inch diameter by 0.063 inch high coin cells were constructed as follows. A cathode composed of $TiS_2$ containing some solid electrolyte was employed in each cell. The $TiS_2$ cathode along with a separate layer of $2.5LiI.Li_4P_2O_2S_5$ electrolyte as prepared in the same manner as in Example 1 and a lithium anode were isostatically compressed at 80,000 psi as described in U.S. Pat. No. 4,477,545 and then assembled into each of the cell housings. The cells were continuously discharged at ambient temperature across various loads to a 1.4 volt cutoff. The voltage readings observed with time are shown in the Table. Each of the cells had an initial impedance of 20 ohms and a final impedance between 20 to 40 ohms.

TABLE

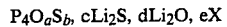

| Cell | Load | Voltage (volts) | Time (hours) |
|---|---|---|---|
| A | 10 K ohm | 2.43 | 0 |
|  | 10 K ohm | 2.35 | 1 |
|  | 10 K ohm | 2.31 | 5 |
|  | 10 K ohm | 2.26 | 13 |
|  | 10 K ohm | 2.11 | 41 |
|  | 10 K ohm | 1.97 | 69 |
|  | 10 K ohm | 1.92 | 77 |
|  | 10 K ohm | 1.87 | 85 |

TABLE-continued

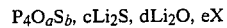

| Cell | Load | Voltage (volts) | Time (hours) |
|---|---|---|---|
|  | 10 K ohm | 1.37 | 137 |
| B | 15 K ohm | 2.47 | 0 |
|  | 15 K ohm | 2.31 | 17 |
|  | 15 K ohm | 2.16 | 65 |
|  | 15 K ohm | 2.05 | 101 |
|  | 15 K ohm | 1.81 | 161 |
|  | 15 K ohm | 1.62 | 189 |
|  | 15 K ohm | 1.39 | 205 |
| C | 30 K ohm | 2.40 | 0 |
|  | 30 K ohm | 2.27 | 85 |
|  | 30 K ohm | 2.17 | 161 |
|  | 30 K ohm | 1.94 | 305 |
|  | 30 K ohm | 1.75 | 377 |
|  | 30 K ohm | 1.34 | 413 |

It should be understood that the foregoing disclosure relates to preferred embodiments of the invention and it is intended to cover all changes and modifications of the invention which do not depart from the spirit and scope of the appended claims.

What is claimed is:

1. A phosphorus oxide-sulfide solid state electrolyte of the composition:

$P_4O_aS_b$, $cLi_2S$, $dLi_2O$, $eX$ where:
X is selected from the group consisting of LiBr, LiCl, LiF, LiI, $Li_2CO_3$, $Li_2SO_4$, $Li_2SiO_3$ and $Li_4SiO_4$;
a is equal to (10−b) with b being greater than 0 and less than 10 with the proviso however that when b is 6 a can be 3;
c and d are from 0 to about 4 with the proviso that when c and d are both greater than 0 then d=4−c, and when c or d is 0 then d or c, respectively, is greater than 0; and
e is from 0 to about 7.

2. The phosphorus oxide-sulfide solid state electrolyte of claim 1 wherein said $P_4O_aS_b$ is selected from the group consisting of $P_4O_5S_5$, $P_4O_4S_6$, $P_4O_3S_7$, $P_4O_2S_8$, and $P_4O_1S_9$.

3. The phosphorus oxide-sulfide solid state electrolyte of claim 1 wherein c and d are from about 1 to about 4 and e is from about 0 to about 5.

4. The phosphorus oxide-sulfide solid state electrolyte of claim 1 wherein said solid state electrolyte is $5LiI.4Li_2S.P_4OS_9$.

5. The phosphorus oxide-sulfide solid state electrolyte of claim 1 wherein said solid state electrolyte is $2LiI.2Li_2S.P_2O_2S_3$.

6. The phosphorus oxide-sulfide solid state electrolyte of claim 1 wherein said solid state electrolyte is $2.5LiI.2Li_2S.P_2O_2S_3$.

7. The phosphorus oxide-sulfide solid state electrolyte of claim 1 wherein said solid state electrolyte is $2LiBr.2Li_2S.P_2O_3S_2$.

8. A solid state cell comprising an anode, a cathode and a phosphorus oxide-sulfide solid state electrolyte of the composition:

$P_4O_aS_b$, $cLi_2S$, $dLi_2O$, $eX$ where:
X is selected from the group consisting of LiBr, LiCl, LiF, LiI, $Li_2CO_3$, $Li_2SO_4$, $Li_2SiO_3$ and $Li_4SiO_4$;

a is equal to (10−b) with b being greater than 0 and less than 10 with the proviso however that when b is 6 a can be 3;

c and d are from 0 to about 4 with the proviso that when c and d are both greater than 0 then d=4−c, and when c or d is 0 then d or c, respectively, is greater than 0; and e is from 0 to about 7.

9. The solid state cell of claim 8 wherein said $P_4O_aS_b$ of said phosphorus oxide-sulfide solid state electrolyte is selected from the group consisting of $P_4O_5S_5$, $P_4O_4S_6$, $P_4O_3S_7$, $P_4O_2S_8$, and $P_4OS_9$.

10. The solid state cell of claim 8 wherein said phosphorus oxide-sulfide solid state electrolyte has c and d values from about 1 to about 4 and an e value from about 0 to about 5.

11. The solid state cell of claim 8 wherein said phosphorus oxide-sulfide solid state electrolyte is $5LiI.4Li_2S.P_4OS_9$.

12. The solid state cell of claim 8 wherein said phosphorus oxide-sulfide solid state electrolyte is $2LiI.2Li_2S.P_2O_2S_3$.

13. The solid state cell of claim 8 wherein said phosphorus oxide-sulfide solid state electrolyte is $2.5LiI.2Li_2S.P_2O_2S_3$.

14. The solid state cell of claim 8 wherein said phosphorus oxide-sulfide solid state electrolyte is $2LiBr.2Li_2S.P_2O_3S_2$.

15. The solid state cell of claim 8 wherein the anode is selected from the group consisting of lithium, lithium alloys, sodium, potassium, rubidium, and silver.

16. The solid state cell of claim 8 wherein the cathode is selected from the group consisting of $TiS_2$, $MoS_3$, $PVP+I_2$, $PVP+I_2+TiS_2$, $TiS_2+MoS_3$, $FeS_2$, $Sb_2S_3$, and $MnO_2$.

17. The solid state cell of claim 15 or 16 wherein the anode is lithium, and the cathode is $TiS_2$.

18. The solid state cell of claim 15 or 16 wherein the anode is lithium and the cathode is $TiS_2+MoS_3$.

* * * * *